United States Patent [19]

Martin, deceased et al.

[11] Patent Number: 4,482,364
[45] Date of Patent: Nov. 13, 1984

[54] OIL GAS/SEPARATOR

[76] Inventors: Reginald Martin, deceased, late of Luton, England; by Winifred White, legal representative, 277 City Rd., Sheffield, England; by Nora Edwards, legal representative, 1 Southfield Way Much, Wenlock, England; John W. Brookes, 3, Gables Close, Chalfont St. Peter, Buckinghamshire, England; Thomas S. Reeve, 72, Halfway Ave., Luton, Bedfordshire, England

[21] Appl. No.: 492,231
[22] Filed: May 6, 1983
[51] Int. Cl.³ .............................................. B01D 19/00
[52] U.S. Cl. ........................................ 55/158; 55/184; 55/191; 55/203
[58] Field of Search ............... 55/159, 183–196, 55/203, 207; 166/75 R, 105.5, 105.6

[56] References Cited

U.S. PATENT DOCUMENTS

| | | | |
|---|---|---|---|
| 1,072,670 | 9/1913 | Strite | 55/194 X |
| 2,311,963 | 2/1943 | Pyle | 55/190 X |
| 2,941,619 | 6/1960 | Sochor | 55/203 |
| 4,053,290 | 10/1977 | Chen et al. | 55/187 |
| 4,231,767 | 11/1980 | Acker | 55/186 |
| 4,330,306 | 5/1982 | Salant | 55/159 |

FOREIGN PATENT DOCUMENTS 687343  5/1964  Canada .................................. 55/203

Primary Examiner—Robert Spitzer
Attorney, Agent, or Firm—Emory L. Groff, Jr.

[57] ABSTRACT

A separator for separating gas from oil in a mixture thereof such as at an oil well head comprises one or a plurality of separator devices (13) each basically comprising a foraminous wall constituted by a sleeve (22;56) surrounding a closely fitting solid core (23) having a plurality of helical channels defining flattened flow paths bounded on a major face by the foraminous sleeve (22;56) so that gas can escape to a gas gallery (20) while the oil tends to pass along the helical channels to an oil collector (16). A secondary outer foraminous sleeve (57) may be provided to vary the effective resistance offered by the foraminous wall by relative displacement with respect to the first mentioned sleeve (56) causing variation in the overlap of the apertures in the two sleeves.

14 Claims, 8 Drawing Figures

OIL GAS/SEPARATOR

The present invention relates generally to the separation of gas from oil in a mixture thereof, and particularly to a method and apparatus for effecting separation of gas from oil at high pressure such as exists, for example, at the well head of an oil well.

It is known that the gaseous content of the oil coming from an oil well limits the availability and usefulness of the oil in the well, and it is conventional practice to burn off or "flare" surplus gas from an oil well. This represents a waste of potentially useful energy. The gas present in the oil, however, represents a considerable disadvantage from the point of view of oil handling since it causes irregular flow and pressure fluctuations which disrupt the smooth working of the oil handling equipment. The commodity of primary interest in an oil well is, of course, the oil to be derived from it, and the feature of the oil well which has paramount importance is therefore the continuity of the oil flow. The present invention seeks to provide apparatus for separating gas from oil in a mixture thereof at high pressure in which continuity of oil flow can be ensured despite irregular flow of the mixture and pressure fluctuations such as are experienced at the well head, and in which there is also an ability to control the pressure drop to requirements.

The present invention also seeks to provide apparatus for separating gas from oil, which uses the energy in the outflowing mixture from the well head to drive the separation process.

According to one aspect of the present invention a separator device for separating gas from oil in a mixture thereof at high pressure, such as at the well head of an oil well, includes a guide duct for guiding the flow of the mixture at high pressure along a flow path a part of the surface area of which is defined by a gas-permeable surface, the flow path being so shaped that expansion of the gas content of the mixture drives it through the said gas-permeable surface where it is collected in a gas collection duct, the said guide duct directing the oil fraction to an oil delivery duct.

In the separator device of the present invention use is therefore made of the pressure in the gas to drive it through the gas-permeable wall, and in one embodiment this is encouraged by increasing, as much as possible, the potential contact area between the gas and the gas-permeable wall by directing the mixture through a flow path having a very flattened flow cross section. The separating effect is also encouraged by the venturi effect if the flattened portion of the guide duct has, in practice, a smaller cross sectional area than the duct guiding the gas/oil mixture to the separator device and the oil delivery and gas collection ducts which individually direct the separated fractions away from the separator device.

The separating effect of the device of the present invention is enhanced if there are provided a plurality of such guide ducts defined by a generally cylindrical gas-permeable sleeve housing a close fitting central core in which there is formed a plurality of shallow, generally axially extending channels. These shallow channels define the portion of flattened flow section and an increase in the separating effect can be achieved if, instead of extending purely axially, the shallow channels in the central core extend helically therealong since this causes a degree of swirl in the gas and oil mixture as it passes through the device encouraging the gas to collect at the radially outer part of the separator whilst the oil tends to remain at a radially inner position with respect to the gas.

It is believed that during its direct flow through a duct such as the duct leading to the separator, the gas tends to collect in a central position within the duct, surrounded by the flowing oil which nevertheless also contains gas bubbles and is therefore in a frothy or foaming state. The action of the separator of the present invention is thus to cause the gas to react differently from the oil to the forces they both experience, subsequently allowing the gas to pass through the gas-permeable wall whilst the oil is held within the separator spaced from the gas-permeable wall. A proportion of the oil will, however, pass through the gas-permeable wall particularly if this is formed, as in the preferred embodiment, of a foraminous sleeve around a central core, and this entrained oil can be separated out under the action of gravity at the relatively lower pressures involved by positioning the separator with its flow axis extending substantially vertically.

In another aspect the present invention comprises a separator device for separating gas from oil in a mixture thereof at high pressure, such as at the well head of an oil well, comprising means for causing the mixture to follow a generally helical flow path defined in part by a gas-permeable wall across which a pressure differential is maintained such that the gas in the mixture is urged to traverse the wall to a gas collection gallery or duct, whilst the oil is directed by guide means to an oil delivery duct. This helical flow or "swirl" of the mixture conveniently takes place within the above mentioned generally cylindrical sleeve which constitutes the gas-permeable wall and which defines the radially outer surface of the generally helical flow path of the mixture. The gas-permeable wall is in a preferred embodiment of the invention, provided with helical rows of perforations aligned with internal channels in such a way that the perforations only extend over a part of the axial extent of the channels leaving a solid wall portion for oil retention. These wall portions are preferably axially spaced. It is preferred that the elongate core has a plurality of helical channels, which may be defined by upstanding helically extending ridges on the core or may be formed as helical grooves in the core. If the core is provided with ridges, these preferably fit tightly against the inner surface of the gas-permeable wall so that each individual helical channel defines an entirely separate helical flow path for the mixture.

Oil entrained with the gas passing through the said gas-permeable wall can be collected at the lower end of the separator device if this is arranged in an upright orientation with the flow path for the mixture extending upwardly therethrough providing the flow cross section in the gas gallery is sufficiently large in relation to the flow cross section within the above mentioned helical flow path to cause a substantial reduction in the velocity of the gas so that oil particles entrained therewith are not carried along with the gas but fall to the lower end of the gas gallery where an oil collection chamber is located.

The gas-permeable wall may have any convenient structure, and may be made of a porous material having pores of any convenient size. However, in order to avoid the possibility of clogging it is preferred that the gas-permeable wall is a foraminous wall having an array of perforations through which oil particles can also pass if entrained with the gas since, with the above described arrangement of the gas galleries, a small amount of oil entrained with the gas can be separated subsequently, and this is preferable to the alternative, which would be required in the case of an oil impermeable wall, of requiring periodic cleaning either by backwash or dismantling.

In a preferred embodiment of the invention the resistance to gas flow across the said gas-permeable surface is adjustable between predetermined minimum and maximum values. This may be achieved in an arrangement in which the gas-permeable wall is a foraminous wall or sleeve by providing means for varying the effective aperture size of the apertures in the foraminous wall or sleeve. Preferably the aperture size is varied by the provision of a secondary foraminous wall or sleeve closely adjacent the first and displaceable with respect thereto so that at least some of the apertures in the secondary wall or sleeve can be moved into or out of register with the apertures in the said wall or sleeve.

If the secondary foraminous sleeve is coaxial with the said foraminous sleeve adjustment can effectively be obtained by relative axial displacement, although preferably the secondary foraminous sleeve is turnable about its axis by means of a motor via a suitable drive transmission of the mixture through a selected number of the separator devices in dependence on the gas pressure, whereby to maintain the oil flow rate within certain values.

Preferably there is further provided an excess pressure safety valve which opens if the pressure of the mixture in the apparatus exceeds a critical threshold value. In a preferred embodiment the plurality of separator devices are positioned as an annular array with their axes upright around a central oil collection chamber interconnected with the individual oil collection means which collect oil from the gas galleries. This oil collection chamber is preferably also connected to the inlet of one or more of the separator devices whereby to recycle the oil collecting therein through that separator device or those separator devices to be passed to the said oil delivery duct. The pressure to drive the oil from the said oil collection chamber to be recycled through one or more of the separator devices is conveniently derived from separated gas drawn from the gas collection duct leading from another of the separator devices in the array.

The apparatus of the present invention may further include a safety valve positioned in the drill string at such a level that it will be between the sea bed and the surface when the final breakthrough into the oilfield occurs. This safety valve is preferably in the form of a single gas separator device as defined above in a series in the drill string at a submarine position as mentioned above, the gas gallery of the separator device having one or a plurality of unidirectional pressure relief valves which are set to open upon the attainment in the gallery of a pressure above a certain threshold value.

The gas-permeable wall constituting part of the flow path of the mixture may have a predetermined fixed effective area, and therefore a fixed resistance to the flow of gas therethrough although since the ratio of gas and oil in the mixture varies considerably and large gas "bubbles" frequently arrive at the well head with the oil, thereby causing rapid and strong fluctuations in the pressure it may be advantageous to be able to vary the effective area of the gas-permeable wall. This may be achieved, for example, by varying the proportion of the wall area occupied by the gas apertures.

One of the known measures taken to counteract the detrimental effects of such variation in the pressure is to provide an extremely strong valve at the well head to serve as a blow off prevention valve (this is housed in an assembly known as the BOP stack) which valve is closed rapidly when the approach of gas bubbles in the oil likely to cause sudden and damaging fluctuations in the pressure is detected by sensors in the drill string and at the well head. In accordance with the principles of the present invention, however, the separator may be constructed in such a way that the resistance to gas flow can be varied to accommodate variations in the gas and oil pressures experienced at the well head.

According therefore to this aspect of the present invention a separator device for separating gas from oil in a mixture thereof at high pressure, such as the well head of an oil well, and having a flow path for the mixture a substantial part of the surface area of which is defined by a gas-permeable surface, is provided with means by which the resistance to gas flow across the surface is adjustable between predetermined minimum and maximum values. Such adjustment of the resistance to flow of the gas-permeable surface may be achieved in a number of ways. For example, if, as discussed hereinabove the gas-permeable surface is constituted by a foraminous wall or sleeve surrounding a central core and defining the flow path for the mixture, there may be provided means for varying the effective aperture size of the apertures in the foraminous wall or sleeve.

The aperture size or the number of apertures which are open may for example be varied by the provision of a secondary foraminous wall or sleeve closely adjacent the first and displaceable with respect thereto so that at least some of the apertures in the secondary wall or sleeve can be moved into or out of register with the apertures in the said wall or sleeve. A secondary filtering system may also be provided for separating residual oil entrained with the gas passing through the foraminous wall. Such filtering systems may incorporate a plurality of passages and oil traps allowing the gas to expand on its passage therethrough whilst collecting oil for delivery to an appropriate oil duct.

In the preferred embodiment of the invention the gas flow passage is constituted by a core with helical grooves therein closely surrounded by a foraminous sleeve, and the secondary sleeve is closely fitted around the said foraminous sleeve and rotatable about a common axis to bring the apertures thereof into or out of register with the apertures in the said foraminous sleeve. Rotation of the secondary sleeve may be effected automatically, via a suitable drive and transmission in dependence on signals received from sensors in the drill string and/or at the well head operable to detect the approach of gas bubbles or regions of strongly varying pressure so that the effective gas passage area in the foraminous sleeve can be substantially increased to accommodate the extra gas flow occurring when such bubbles arrive at the well head.

Various embodiments of the present invention will now be more particularly described, by way of example, with reference to the accompanying drawings, in which.

Figure 1:
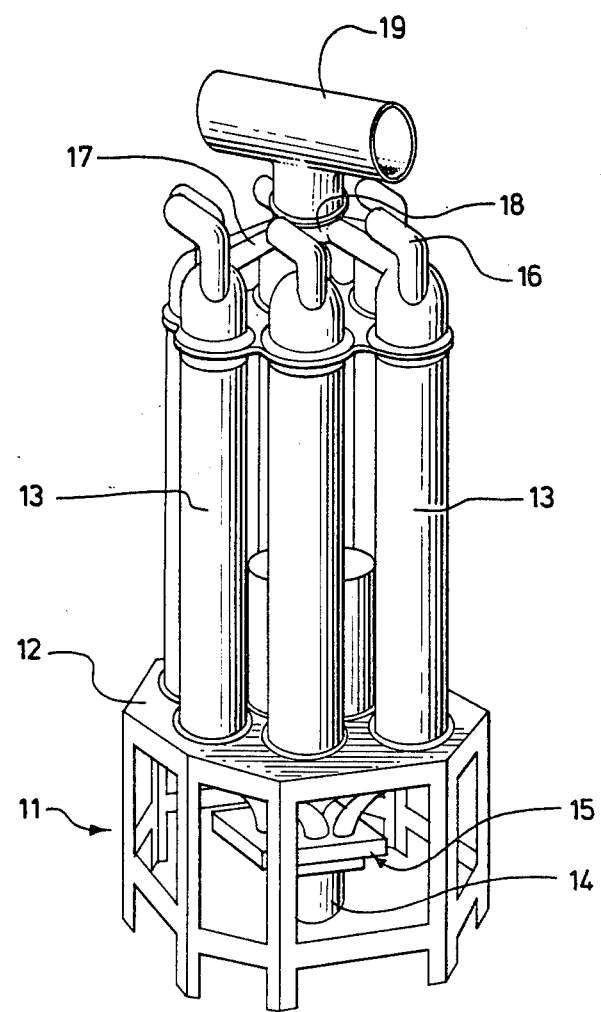
FIG. 1 is a perspective view of apparatus incorporating a plurality of separator devices of the present invention.

Referring now to the drawings, in FIG. 1 the apparatus as generally indicated comprises a base support framework 11 having a support platform 12 above which projects an array of six separator devices, each generally indicated 13, and below which is located an input flow coupling 14, for the mixture of oil and gas to be separated, and a gas flow control valve arrangement generally indicated 15.

Each gas/oil separator device 13 has two outlets 16,17 at its upper end, the outlets 16 comprising oil delivery ducts, and the outlets 17 comprising gas collection ducts which lead to a common gas header 18 from which extends a gas delivery duct 19.

Figure 2:
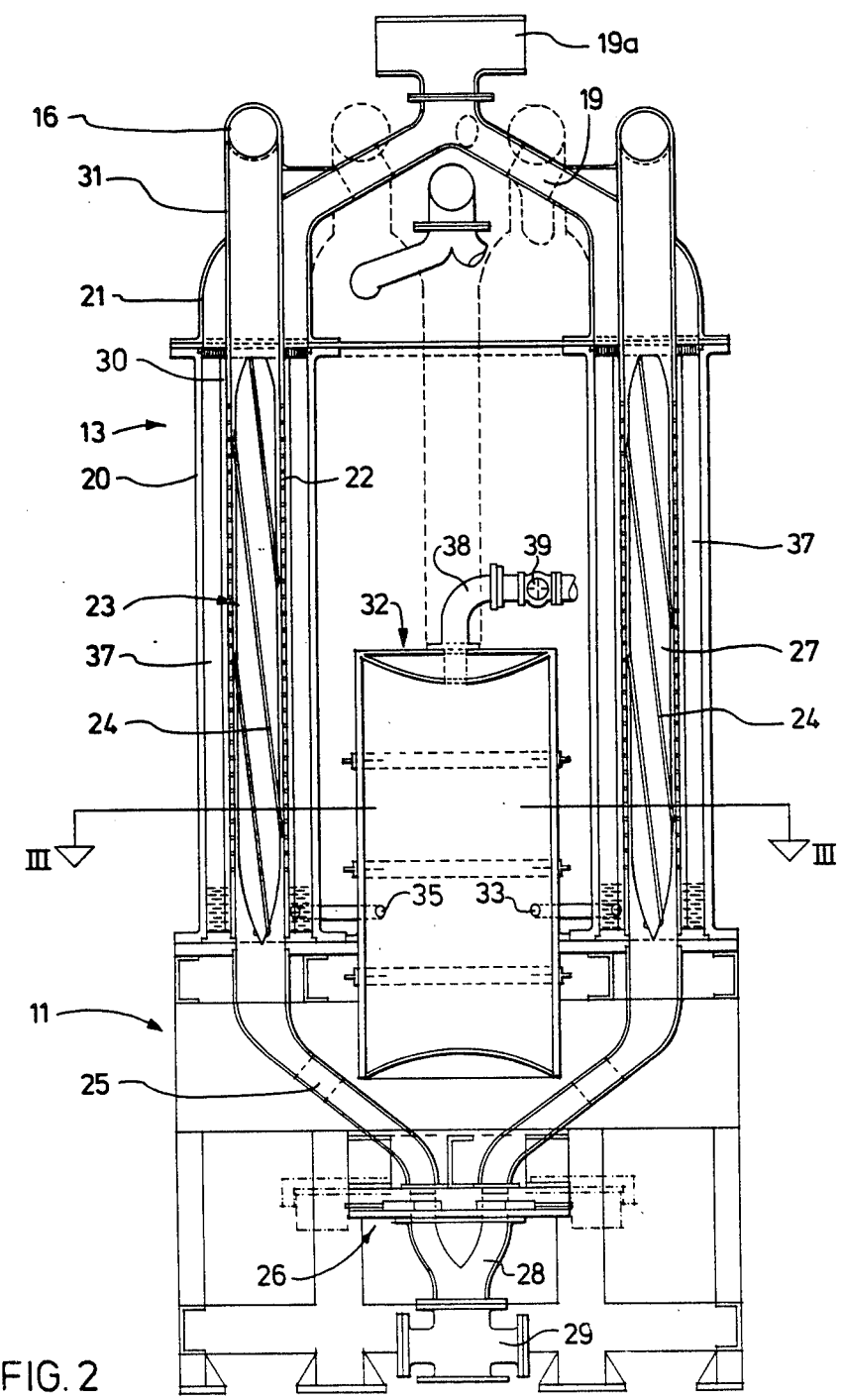
FIG. 2 is an axial view of a first embodiment of the separator apparatus illustrated in FIG. 1.
Figure 3:
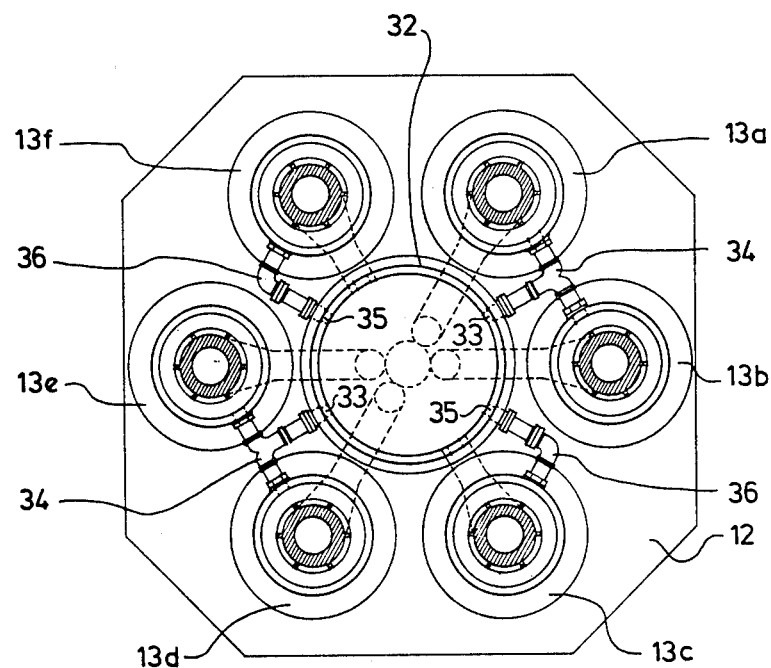
FIG. 3 is a cross sectional view taken on the line III—III of FIG. 2.

The internal construction of the gas/oil separator devices 13 can be seen in FIGS. 2 and 3. Each separator column 13 comprises an outer cylindrical casing 20 flanged at each end for connection to the support surface 12 and a header assembly 21 at the lower and upper ends respectively. Within the cylindrical casing 20 and coaxial therewith is a cylindrical foraminous sleeve 22 housing a core 23 having six helically extending upstanding ridges 24 which define between them six shallow helical channels 27 (see FIG. 3). The diameter of the core 23 is such that the radially outer surfaces of the ridges 24 are a close fit within the inner surface of the foraminous sleeve 22 so that the helical channels 27 within the sleeve 22 are separate from one another throughout the whole length of the core 23 which extends axially the full length of the outer casing 20 from the lower to the upper flange thereof.

The perforations in the foraminous sleeve 22 may be regularly spaced over the whole of the length of the sleeve or may follow a spacing pattern determined in a manner such as best to accommodate variations in pressure along the length of the flow path defined by the separator. Each perforation is conveniently circular and in the region of ⅛" diameter. The relative diameters of the outer casing 20 and the foraminous sleeve 22 are such that the flow cross section within the annular space between them is substantially greater than the flow cross section within the helical ducts defined between the foraminous sleeve 22 and the core 23. As shown the helical ducts have only one turn within the length of the core 23; in practice this may differ, however, and ducts having a plurality of turns may be employed. The number of turns may be varied in dependence on the conditions experienced at the well-head in order to obtain the best effect, and this can be achieved by interchanging the cores for others having a different pitch, or by constructing a variable pitch core.

The gas/oil mixture supplied to the lower end of each separator 13 is directed thereto by a respective mixture duct 25 extending from a control valve assembly, generally indicated 26 which receives gas and oil via a branching duct 28 from an input coupling 29.

As can be seen from FIG. 3 only four of the separators 13 receive the mixture directly from the control valve assembly 26, these separators being identified by the subscript letters a,b,d and e. The two other separators 13, identified by the subscript letters c and f are connected to receive recirculated oil as will be described below.

To the upper flange of each outer cylindrical casing 20 of each separator 13 is connected a respective branch of gas header assembly 21 comprising a plurality of gas collection ducts 19 leading to a common gas delivery duct 19a which, as can be seen in FIG. 1, extends centrally from the upper end of the apparatus.

Each foraminous sleeve 22 within the separator 13 has an imperforate section 30 at the upper end thereof which continues as an oil delivery duct 31 leading to the oil delivery headers 16 of FIG. 1. These latter may, of course, be joined to a common oil delivery pipe at a joint downstream from the separating apparatus.

Located centrally within the array of six separators is a recirculating oil tank 32 having inlets 33 connected by connection ducts 34 (see FIG. 3) to the lower ends of the cylindrical outer casings 20 of each of the four separators 13a, 13b, 13d, 13e. Two outlets 35 from the lower end of the recirculation tank 32 lead, via ducts 36 to the main mixture inlet ports of the separators 13c, 13f. At the upper end of the oil recirculation tank 32 is a gas inlet supplied by a duct 38 via a control valve 39 from the gas gallery 37 constituted by the annular space between the outer casing 20 and the foraminous sleeve 22 of one or more of the separators 13a, 13b, 13d, 13e.

The apparatus described above operates as follows. The mixture of oil and gas in the condition at which it arrives at the well head of an oil well is supplied to the inlet coupling 28 from where it flows through the ducts 28 to the control valve assembly 26. This control valve assembly is operated in dependence on the current pressure and flow rate in the incoming material to open communication to one or more of the supply ducts 25 leading to the separators 13a, 13b, 13d, 13e. When the pressure and flow rate are high all the valves in the assembly 26 will be open so that all four separator columns will be in operation. At lower pressures one or more columns is shut off to compensate the apparatus for such variation so that the working pressures within the apparatus are maintained, as far as possible, within predetermined values.

As the mixture of gas and oil enters the separator column 13 from the supply duct 25 it experiences a progressive reduction in its available flow path and is guided into the helical channels 27. It will be noted from FIG. 2 that the core 23 is tapered for the initial part of the mixture flow path within the separator so that the change in flow cross section is progressive over an initial section. With the dimensions illustrated the individual channels 27 have a flow cross section which is largely determined by the cylindrical inner surface of the foraminous wall of the outer sleeve 22 and the curved surface of the core 23. Only a very small proportion, less than 20%, of the overall surface area of the flow section is constituted by the radial walls of the ridges 24. Because of this, and because of the swirling action introduced by the helical flow path of the mixture the gas tends to collect at the radially outer part of the channels 27 whilst the oil flows up the radially inner part in contact with the surface of the core 23. The gas, which is under considerable pressure, passes through the apertures in the foraminous sleeve wall 22 into the gas galleries defined by the annular space 37 between the outer casing 20 and the sleeve 22 where it experiences a substantial drop in the pressure due to the very much greater cross sectional area of this passage in relation to the flow section of the helical channels 27. The gas then flows through the header 21 and delivery duct 19 to the gas collector duct 19a. The oil continues up the central passage within the separator 13 into the oil delivery duct 31 from where it passes to the oil delivery headers 16.

Inevitably a proportion of the oil will pass through the sleeve 22 entrained with the gas as it expands. Because of this increased flow cross section the velocity of the gas falls substantially and suddenly, and oil particles entrained therewith can thus no longer be sustained by the gas flow and fall under the action of gravity to an oil collection sump defined by an imperforate lower section of the sleeve 22, between this sleeve and the outer casing 20. Such separated oil passes through the recirculation ducts 34 into the oil recirculation chamber 32 where, due to the gas pressure arriving via the duct 38 it is driven to the inlet ports of the recirculation columns 13c, 13f via the ducts 36. These columns necessarily work at a lower pressure than the other four columns in the array due to the fact that the driving gas is derived from an upstream position with respect to the first four separator columns and consequently the gas pressure is lower than the pressure at the inlet 28 to the apparatus as a whole.

The operation of these recirculation separators may be intermittent if the amount of entrained oil collecting in the sumps in the four main separators is insufficient to maintain continuous flow. For this purpose the control valve 39 in the duct 38 is provided. Although this is shown as a manually operated hand wheel gate valve, it will be appreciated that such valve may be operated automatically or remotely, and that by closing off the driving gas oil can collect in the sumps at the lower end of the separators 13, and can drain under the action of gravity into the recirculation tank 32 until sufficient has been collected to re-open the recirculation separators 13c and/or 13f.

In this way the operation of the apparatus can be controlled to accommodate a wide range of fluctuations in the inlet pressure and flow rates.

A further control on the apparatus can be obtained by interchanging the cores 23 for cores of different pitch. It is envisaged that cores having pitches of 2 ft, 4 ft, 6 ft, and 8 ft would be provided, these to be used independently of one another in the assembled apparatus to increase or reduce the number of turns of the helix in the length of the separator to accommodate fluctuations in pressure and flow rate as the well varies.

Figure 4:
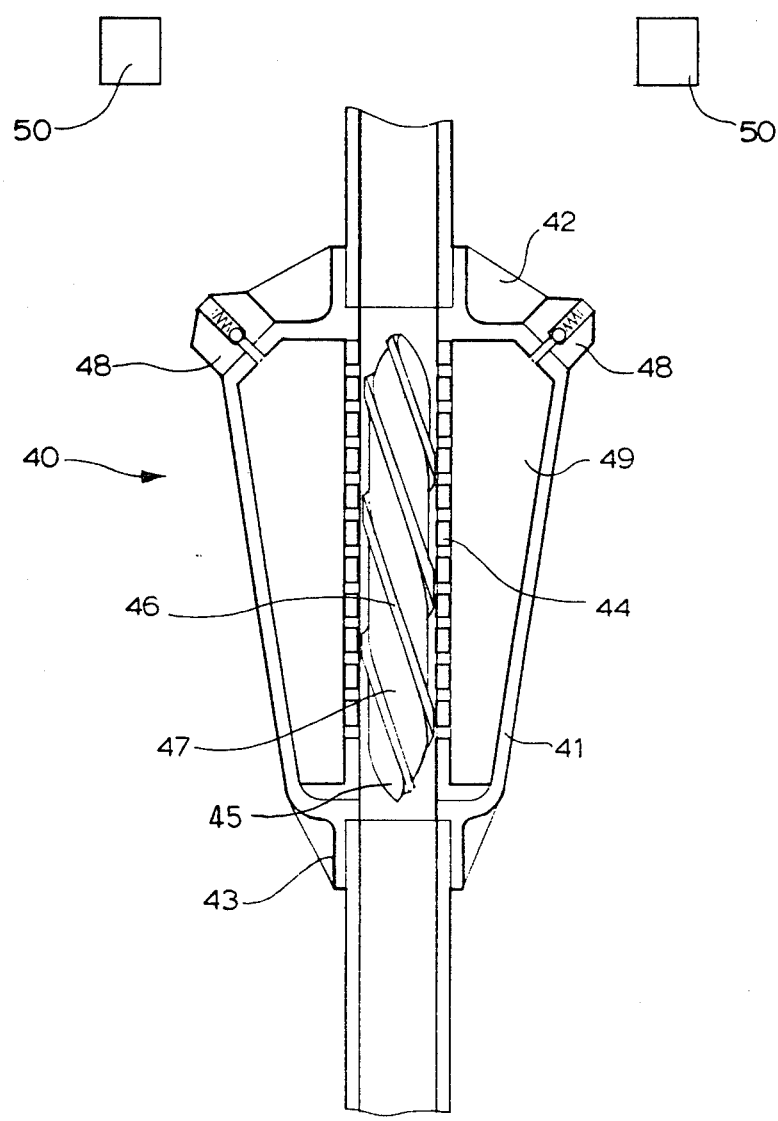
FIG. 4 is an axial section of a drill string safety valve incorporated in the separator apparatus of the present invention.

In FIG. 4 there is shown a submarine safety valve which is positioned in series in the drill string to be at a submarine level when the final breakthrough into the oilfield occurs. As can be seen in FIG. 4 the safety valve, which is generally indicated 40, comprises an outer casing 41 which tapers from an upper end 42 to a lower or inlet end 43.

Within the tapering outer casing 41 is a generally cylindrical inner sleeve comprising a parallel sided cylindrical gas-permeable membrane 44 which may be of similar construction to the foraminous sleeve 22 in the gas/oil separator devices 13 illustrated in FIGS. 2 and 3. In the same way the cylindrical sleeve 44 houses the core 45 having a plurality of helically extending upstanding ridges 46 defining between them shallow helical channels 47.

Arranged around the wider end of the casing 41 are six unidirectional pressure relief valves 48 which communicate with the gas gallery in the chamber 49 between the outer surface of the foraminous sleeve 44 and the casing 41. Each unidirectional valve 48 is set to the predetermined pressure in excess of the normal working pressure within the drill string so that if excess pressures occur, particularly on breaking through the final section of rock into the oilfield, the drill rig itself will be relieved of the surge since this will be released through the valves 48. At normal pressures the valves 48 will remain closed and the safety device will act simply as a section of the hollow drill string allowing the slurry, mud and gas to pass through it without any change.

Sensors 50 may be provided in the region between the safety valve 40 and the surface to detect the release of gas bubbles through the valves 48 so that a surge in pressure giving rise to such pressure relief action can be detected before it reaches the rig and appropriate action can be taken.

Figure 5:
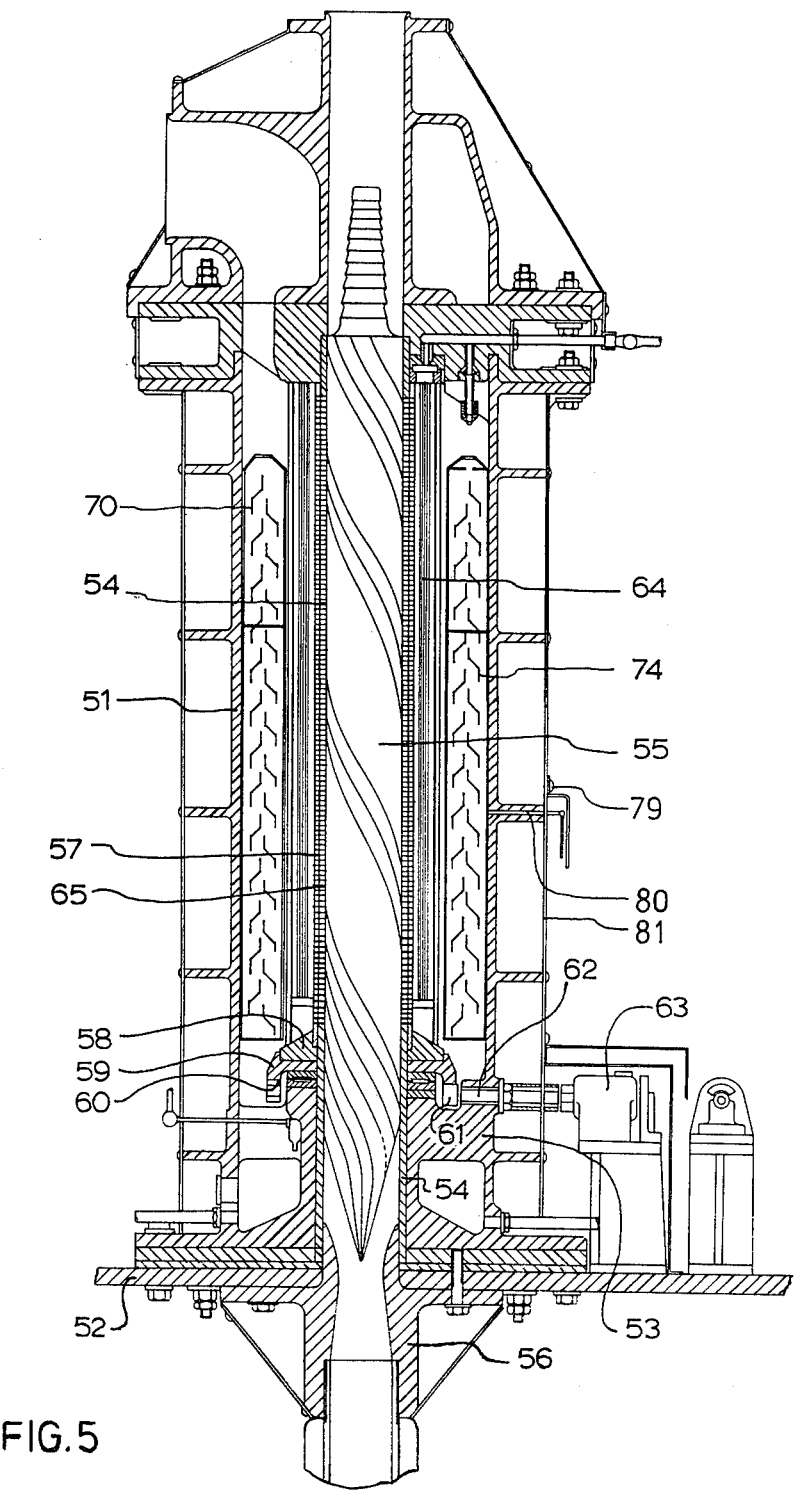
FIG. 5 is an axial sectional view through a separator device formed as a second embodiment of the present invention.
Figure 6:
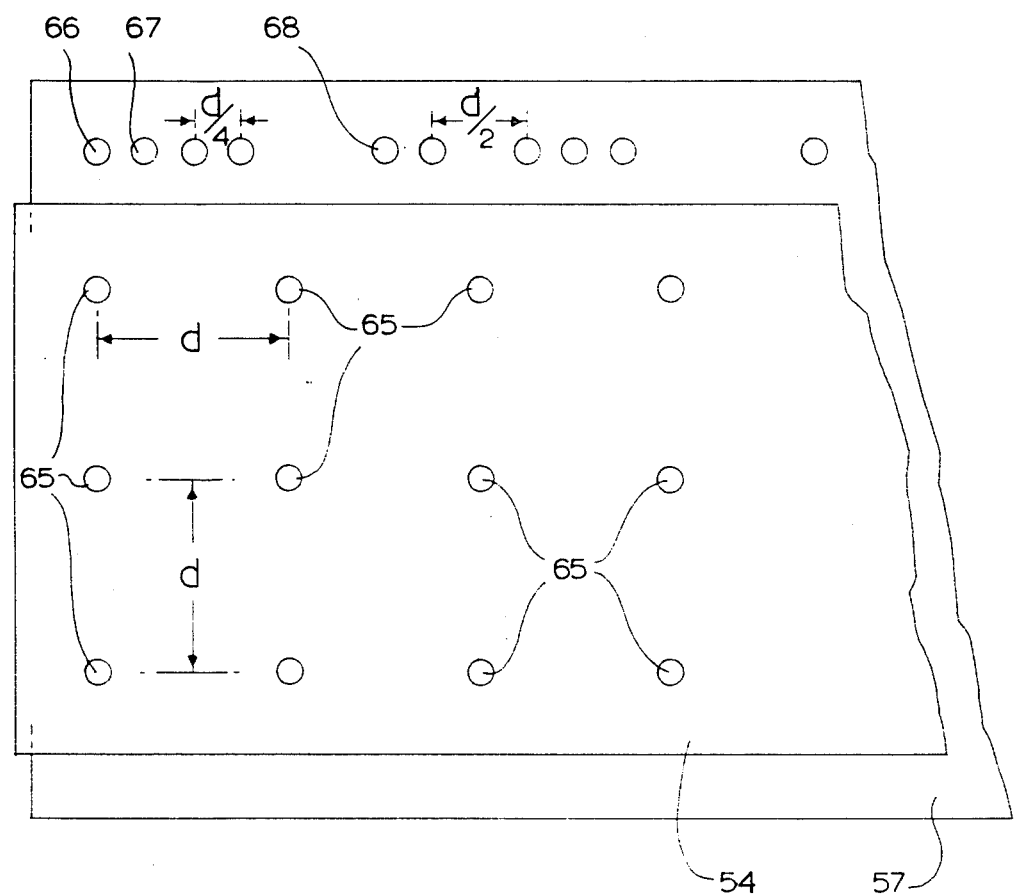
FIG. 6 is a diagram illustrating a suitable arrangement of apertures in the separator device of FIG. 5 to provide a variable flow resistance.

Referring now to FIGS. 5 and 6 the alternative separator device shown therein comprises a generally cylindrical support casing 51 mounted on a platform base 52 which also supports a base structure 53.

The base 53 supports a cylindrical sleeve 54 surrounding a central core 55 having a plurality of helical grooves formed therein. The core 55 is tapered at its lower end and enters the mouth of a venturi block 56 secured to the platform 52 and constituting an entrance coupling to the separator for connection to the upper end of a delivery pipe from a blow off prevention valve (BOP stack, not shown) at the well head. The internal flow passage within the venturi block 56 is shaped with a smoothly curved construction such that the flow path from the BOP stack is divided at the entrance end of the central core 55 having the helical grooves without creating turbulence.

The sleeve 54 surrounds the core 55 and over the majority of its length has a plurality of apertures 65. Around the sleeve 54 is a secondary sleeve 57 which also has a plurality of apertures the spacing of which is different from that of the apertures in the sleeve 54. The outer sleeve 57 is a sliding fit over the inner sleeve 54 and is supported on an annular support 58 carried by a support member 59 having a ring of gear teeth 60 which mesh with pinions 61 driven by a shaft 62 from a motor 63. The motor 63 may be a stepping motor.

Surrounding the outer sleeve 57 is a cylindrical chamber 64 which houses a secondary oil separation filter of any suitable type; in the illustrated embodiments it comprises a tubular spiral filter bank of high tensile nickel-titanium tubes arranged in six peripherally adjacent part-cylindrical banks. Surrounding this filter is a further bank of separator cartridges in the form of an array of platelets in a honeycombed structure 74. The spiral tubular filter banks 64 and the outer honeycomb structure 74 are both arranged to trap the oil entrained with gas passing through the apertures in the sleeves 54,57. As can be seen more clearly in FIG. 6 the apertures in the sleeve 54, identified with the reference numeral 65 are spaced by a distance d from one another in a regular array both in the peripheral and the axial direction. The apertures in the sleeve 57, on the other hand, although being spaced regularly by the separation d in the axial direction, have an irregular spacing in the peripheral direction, some being spaced by the distance d some by d/2 and some by d/4. The pattern illustrated in FIG. 6 can be considered to repeat around the periphery of the sleeve 57. In this simple embodiment, therefore, the sleeve 57 can be positioned in a first position in which all the apertures 65 in the inner sleeve 54 have a corresponding aperture 66 in register therewith. By displacing the sleeve 57 to the left of FIG. 6 with respect to the sleeve 54, however, the apertures 66 can be displaced out of register with the apertures 65 to bring an aperture 67 in register with one of the four apertures 65 of the sleeve 54. Thus, in this situation, only one quarter of the apertures 65 are open, the remainder being closed by the adjacent sleeve 57. Further movement of the sleeve 57 until the apertures 68 are in register with two of the apertures 65 allows one half of the apertures 65 to be open whilst the remainder are closed. By suitably arranging the pattern of apertures in the sleeve 57 four positions in which one, two, three or four apertures 65 from each set of four thereof can be selectively opened by bringing an appropriate aperture from the sleeve 57 into register therewith thereby allowing for a four-fold variation in resistance which can be accommodated by the separator to be obtained. In normal circumstances the sleeve 57 will be set with two or one of each set of four apertures open, and would be turned to open three or four apertures as necessary to accommodate an increase in pressure when gas bubbles arrive at the well head.

Figure 7:
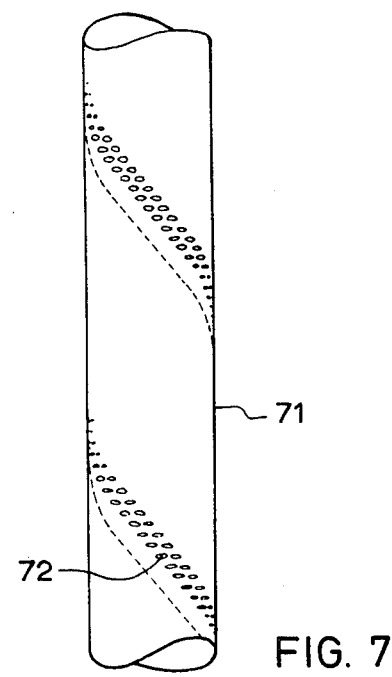
FIG. 7 illustrates a further separator sleeve structure.
Figure 8:
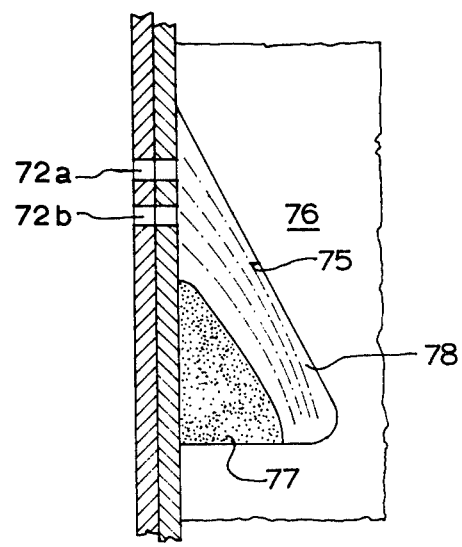
FIG. 8 is a cross sectional view of a part of the sleeve of FIG. 7.

Referring now to FIGS. 7 and 8 there is shown a perforated sleeve suitable for replacing the perforated sleeve 56 in the embodiment of FIG. 5 or, indeed, in the embodiment of FIG. 2. This sleeve, only part of which is illustrated in FIG. 7, is generally indicated with the reference numeral 71. It has a helical double row of apertures 72 having limited axial extent, that is tranverse the length of the helically extended row. Two further double rows (now shown) are intercalated therewith to form a triple start helix. The wall portion of the sleeve 71 between adjacent rows of apertures is imperforate.

FIG. 8 illustrates the cross sectional shape of a channel 75 formed within a core 76 closely fitting within the sleeve 71 in the same way as the core 55 fits within the sleeve 56 in the embodiment of FIG. 5.

The spiral groove 75 has a triangular cross section defined by a substantially radial wall 77 and an inclined wall 78 lying at approximately 45° to the diametral plane of the core to which the generatrix of the wall 77 is parallel. In FIG. 8 can be seen two of the apertures in the rows 72, indicated 72a, 72b, and these, as illustrated in FIG. 7, are eliptical with the major axis perpendicular to the length of the sleeve 71. As can be seen in FIG. 8 the row of apertures 72 is aligned with that portion of the groove 76 adjacent the apex of the triangle remote from the side 77. Thus, as the oil and gas mixture flows around the helical path defined by the channel the forces to which the gas and oil are subject cause the gas to occupy the space parallel to the side 78 whilst the oil occupies the space defined by the apex of the triangle opposite the side 78. The gas thus communicates with the apertures 72a, 72b whilst the oil is retained in the channel by the imperforate section of the sleeve so that it is conveyed to the end of the helical channel from where it goes to the oil collecting passages.

Referring back to FIG. 5, the cleaning of the gas/oil separator device shown can be programmed to take place regularly, after a certain flow has passed, this being detected by ultrasonic sensors 79,80 located on the outer casing wall 81 and on the main cylindrical support casing 51.

What is claimed is:

1. In a separator device for separating gas from oil in a mixture thereof at high pressure, such as at the well head of an oil well, the improvement comprising:
means for causing the mixture to follow a generally helical flow path,
means defining in part said generally helical flow path including a radially outer gas-permeable wall, said gas-permeable wall constituting part of a generally cylindrical sleeve, said generally helical flow, path being defined in part by said sleeve,
means for generating a pressure differential across said gas permeable wall such that said gas in said mixture is urged to traverse said gas-permeable wall,
a gas collection gallery located radially outwardly of said gas-permeable wall for collection of said gas traversing said wall, and
guide means for directing oil retained by said gas-permeable wall to an oil delivery duct.

2. The separator device of claim 1, wherein there are provided means for separately collecting oil entrained with said gas passing through said gas-permeable wall.

3. The separator device of claim 1, wherein said flow path for said mixture of gas and oil is further defined by an elongate core within said cylindrical sleeve
means defining at least one helical channel in said cylindrical sleeve for causing said mixture to follow said generally helical flow path.

4. The separator device of claim 3, wherein said elongate core has a plurality of such helical channels, and said means defining said channels comprise a plurality of upstanding helically extending ridges on said core, said ridges fitting tightly against the inner surface of said gas-permeable wall.

5. The separator device of claim 1, wherein said gas-permeable wall is foraminous.

6. The separator device of claim 1, wherein said gas-permeable wall is foraminous and there are further provided;
adjustment means operable to vary the resistance to gas flow across said gas-permeable wall, said adjustment means allowing the resistance to be adjustable between predetermined minimum and maximum values.

7. The separator device of claim 6, wherein said adjustment means for varying the resistance to gas flow across said gas-permeable surface is operative to vary the effective aperture size of the apertures in said foraminous wall.

8. The separator device of claim 7, wherein the aperture size of said apertures is varied by the provision of a secondary foraminous wall closely adjacent the first and displaceable with respect thereto so that at least some of the apertures in said secondary wall can be moved into or out of register with said apertures is said wall, said secondary foraminous wall being in the form of a sleeve coaxial with said foraminous sleeve and turnable about its longitudinal axis; motor means and drive transmission means being provided for effecting such movement.

9. In apparatus for separating gas from oil in a mixture thereof at high pressure, such as at the well head of an oil well, the improvement comprising:
a plurality of separator devices as defined in claim 1, and
a flow control valve assembly for directing the flow of said mixture through a selected number of said separator devices in dependence on the gas pressure, whereby to maintain the oil flow rate within certain values.

10. The apparatus of claim 9, wherein there is further provided:
an oil collection chamber for collecting oil carried through said gas-permeable wall entrained with the gas, said oil collecting chamber being located in a central position surrounded by said plurality of gas separator devices in an array thereof,
each said separator device having an inlet,
means connecting said oil collection chamber to the inlet of at least a selected one of said separator devices whereby to recycle the oil collecting therein through said at least one separator device for delivery to said oil delivery duct.

11. The apparatus of claim 10, wherein there are further provided means for deriving the pressure to drive said oil from said oil collection chamber to be recycled through said at least one of said separator devices from separated gas drawn from said gas collection duct leading from another of said separator devices in said array.

12. The separator device of claim 1, wherein said sleeve means defining said generally helical flow path has a plurality of apertures therein in a helical array, the axial dimensions of each turn of said helical array being less than the corresponding axial dimensions of each turn of said flow path.

13. The separator device of claim 12, wherein said flow path is generally triangular in cross section.

14. The separator device of claim 13, wherein said triangular section flow path includes a first side inclined at an acute angle to the axis of said sleeve means, and said array of apertures is located closely adjacent said acute angle.

* * * * *